US012149008B2

(12) United States Patent
Bharambe et al.

(10) Patent No.: US 12,149,008 B2
(45) Date of Patent: Nov. 19, 2024

(54) LOW-FOOTPRINT DUAL-BAND ULTRA-WIDEBAND ANTENNA MODULES

(71) Applicant: Google LLC, Mountain View, CA (US)

(72) Inventors: Vivek Tulshiram Bharambe, San Jose, CA (US); Pei Li, Milpitas, CA (US); Matthew Slater, Chicago, IL (US)

(73) Assignee: Google LLC, Mountain View, CA (US)

( * ) Notice: Subject to any disclaimer, the term of this patent is extended or adjusted under 35 U.S.C. 154(b) by 69 days.

(21) Appl. No.: 17/821,343

(22) Filed: Aug. 22, 2022

(65) Prior Publication Data

US 2022/0399646 A1 Dec. 15, 2022
US 2024/0266734 A9 Aug. 8, 2024

Related U.S. Application Data

(60) Provisional application No. 63/371,958, filed on Aug. 19, 2022.

(51) Int. Cl.

| | |
|---|---|
| ***H01Q 5/385*** | (2015.01) |
| ***H01Q 1/24*** | (2006.01) |
| ***H01Q 5/25*** | (2015.01) |
| ***H01Q 9/04*** | (2006.01) |

(52) U.S. Cl.
CPC ............. *H01Q 5/385* (2015.01); *H01Q 1/243* (2013.01); *H01Q 5/25* (2015.01); *H01Q 9/0414* (2013.01)

(58) Field of Classification Search
CPC .......... H01Q 1/243; H01Q 5/25; H01Q 5/385; H01Q 9/0414
See application file for complete search history.

(56) References Cited

U.S. PATENT DOCUMENTS

2008/0129639 A1* 6/2008 Mitsugi .................. H01Q 1/243 343/876
2015/0364938 A1 12/2015 Lapetina et al.
2017/0223878 A1 8/2017 Lee et al.
(Continued)

FOREIGN PATENT DOCUMENTS

CN 107546863 A 1/2018

OTHER PUBLICATIONS

Ding, et al., "Reducing Internal Electronic Noise in Electronic Devices", Technical Disclosure Commons, https://www.tdcommons.org/dpubs_series/7170, Jul. 14, 2024, 11 pages.
(Continued)

*Primary Examiner* — Dameon E Levi
*Assistant Examiner* — Leah Rosenberg
(74) *Attorney, Agent, or Firm* — Colby Nipper PLLC

(57) ABSTRACT

This document describes low-footprint dual-band ultra-wideband (UWB) antenna modules. A described UWB antenna module may be used as an internal part of a mobile device (e.g., cellphone, tablet, and/or other mobile devices). The UWB antenna module includes a multi-layer dual-band antenna that includes a set of multi-layer patch antennas, each patch antenna including a layer with a conductive ground plate, a feeding plate layer, and a parasitic strip layer with two parasitic strips, one configured to resonate at a frequency within a first band of the dual-band antenna, the other configured to resonate at a frequency within a second band of the dual-band antenna. The parasitic strips are electromagnetically coupled to the feeding plate.

11 Claims, 8 Drawing Sheets

(56) References Cited

U.S. PATENT DOCUMENTS

| | | | | |
|---|---|---|---|---|
| 2018/0123245 | A1* | 5/2018 | Papió Toda | H01Q 9/16 |
| 2018/0294567 | A1* | 10/2018 | O'Brien | H01Q 13/206 |
| 2019/0020110 | A1* | 1/2019 | Paulotto | H01Q 5/392 |
| 2020/0106183 | A1* | 4/2020 | Fabrega Sanchez | H01Q 25/001 |
| 2021/0066807 | A1 | 3/2021 | Lee et al. | |
| 2021/0126366 | A1* | 4/2021 | Sudo | H01Q 5/378 |
| 2021/0359415 | A1* | 11/2021 | Takaki | H01Q 21/28 |
| 2022/0094048 | A1* | 3/2022 | Wu | H01Q 3/34 |
| 2022/0094061 | A1* | 3/2022 | Yong | H01Q 5/385 |
| 2023/0179020 | A1 | 6/2023 | Kim et al. | |
| 2024/0113433 | A1* | 4/2024 | Onaka | H01Q 5/385 |

OTHER PUBLICATIONS

Jeong, et al., "Smartwatch Strap Wireless Power Transfer System with Flexible PCB Coil and Shielding Material", Aug. 1, 2018, 10 pages.

Li, et al., "AA Wireless Charging Coil Stack-up For Thermal Mitigation And Qi Wireless Charging Coil Stack-up For Thermal Mitigation And Qi Compliance Complianc", Technical Disclosure Commons, https://www.tdcommons.org/dpubs_series/7171, Jul. 14, 2024, 11 pages.

Weiss, et al., "Qi Compliant Wireless Charger with PCB Integrated Matnetic Material", Jun. 2019, 5 pages.

* cited by examiner

Layer 2

Layer 1

LOW-FOOTPRINT DUAL-BAND ULTRA-WIDEBAND ANTENNA MODULES

RELATED APPLICATION

This application claims priority under 35 U.S.C. § 119(e) to U.S. Provisional Patent Application 63/371,958, filed on Aug. 19, 2022 which is incorporated herein by reference in its entirety.

SUMMARY

This document describes low-footprint dual-band ultra-wideband (UWB) antenna modules. In aspects, the UWB antenna module is configured as an angle of arrival (AoA) module that utilizes two to three patch antennas. A described UWB antenna module may be used as an internal part of a mobile device (e.g., cellphone, tablet, and/or other mobile devices). The antenna module is multi-layer because it includes patch antennas that each include multiple layers of conductive and non-conductive materials. Some components of the multiple layers connect electrically, through conductive vias between layers. Other components of the multiple layers couple electromagnetically. A dual-band antenna is an antenna which is sensitive at two different radio bands (groups of frequencies), one band being a higher frequency band than the other band.

The UWB antenna module includes a multi-layer dual-band antenna that includes a set of multi-layer patch antennas, each patch antenna including a layer with a conductive ground plate, a feeding plate layer, and a parasitic strip layer with two parasitic strips, one configured to resonate at a frequency within a first band of the dual-band antenna, the other configured to resonate at a frequency within a second band of the dual-band antenna. The parasitic strips are electromagnetically coupled to the feeding plate.

This Summary is provided to introduce simplified concepts of the low-footprint dual-band ultra-wideband (UWB) antenna modules of the present disclosure, which are further described below in the Detailed Description. This Summary is not intended to identify essential features of the claimed subject matter, nor is it intended for use in determining the scope of the claimed subject matter.

BRIEF DESCRIPTION OF THE DRAWINGS

The details of one or more aspects of a low-footprint dual-band ultra-wideband (UWB) antenna module are described in this document with reference to the following drawings.

The same numbers are used throughout the drawings to reference like features and components.

DETAILED DESCRIPTION

Figure 1:
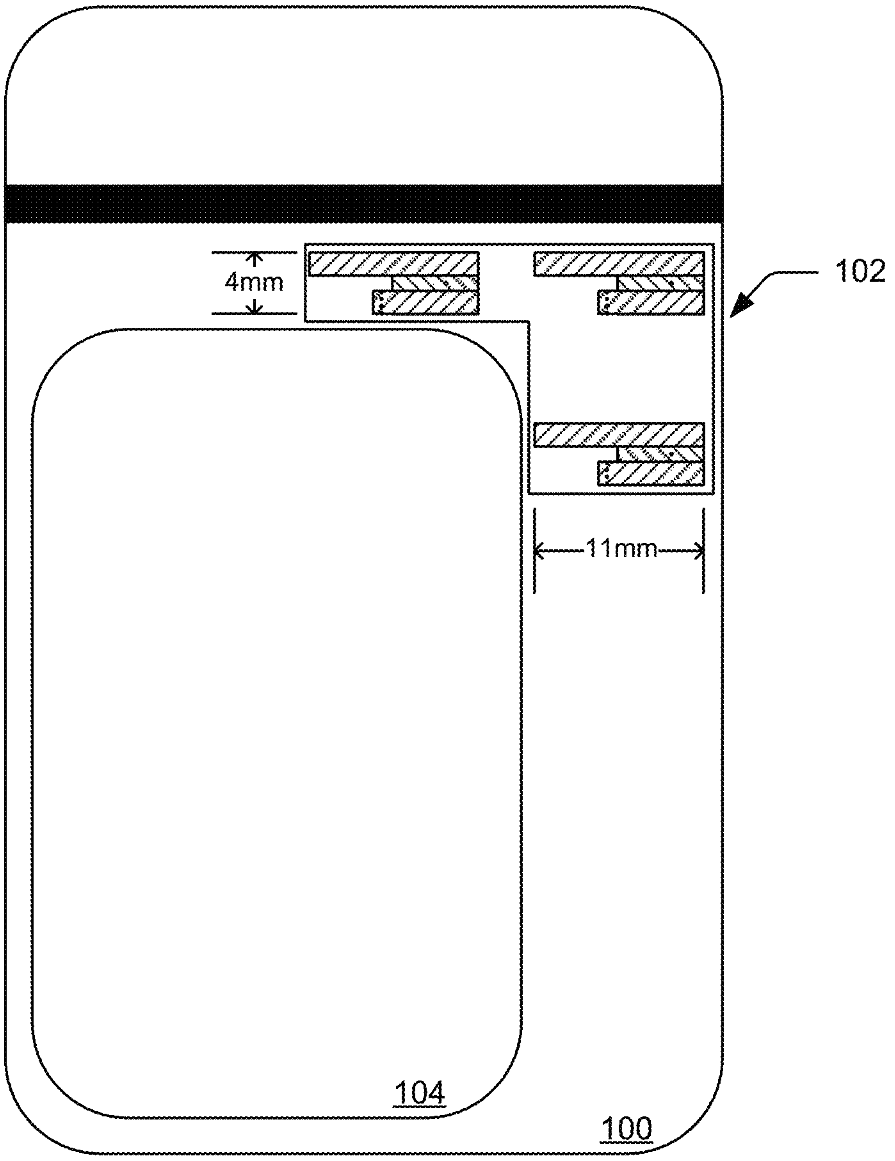
FIG. 1 illustrates an example of a mobile device with a UWB antenna module of some aspects.

This document describes low-footprint dual-band ultra-wideband (UWB) antenna modules. In particular, a described UWB antenna module may be used as an internal part of a mobile device (e.g., cellphone, tablet, and/or other mobile devices).

The antenna module is multi-layer because it includes patch antennas that each include multiple layers of conductive and non-conductive materials. Some components of the multiple layers connect electrically, through conductive vias between layers. Other components of the multiple layers couple electromagnetically. A dual-band antenna is an antenna which is sensitive at two different radio bands (groups of frequencies), one band being a higher frequency band than the other band.

The UWB antenna module includes a multi-layer dual-band antenna that includes a set of multi-layer patch antennas, each patch antenna including a layer with a conductive ground plate, a feeding plate layer, and a parasitic strip layer with two parasitic strips, one configured to resonate at a frequency within a first band of the dual-band antenna, the other configured to resonate at a frequency within a second band of the dual-band antenna. The parasitic strips are electromagnetically coupled the feeding plate.

The parasitic strips may be each of an electrical length (also known as phase length) to resonate at the frequency of one of the two frequency bands (e.g., radio frequency bands) of the antenna module. In some aspects, one parasitic strip is an open-circuited parasitic strip (sometimes referred to as an "open parasitic strip" or "open-circuit parasitic strip"). The open-circuited parasitic strip has an electrical length of exactly or approximately (e.g., within 0.1%, 1%, 5%, 10%, etc. of) one-half of a wavelength (within the specific material of the strip) of the higher frequency band. In some aspects, the second parasitic strip is a short-circuited parasitic strip (sometimes referred to as a "shorted parasitic strip" or "short-circuit parasitic strip"). The short-circuited parasitic strip has an electrical length of exactly or approximately (e.g., within 0.1%, 1%, 5%, 10%, etc. of) one-quarter of a wavelength (within the specific material of the strip) of the lower frequency band, with a set of vias connecting the second parasitic strip to the ground layer. This patch antenna configuration is narrower than many conventional patch antennas. The narrower patch antennas provide an advantage over many conventional patch antennas due to their smaller size, which permits a favorable form factor, leaves additional room for a larger battery, and so forth.

In some aspects, the patch antennas are arranged as a set of three patch antennas, each aligned parallel to the others, arranged as two patch antennas including a vertical pair and the third patch antenna including a horizontal pair with one of the first two patch antennas. In alternate aspects, the set of patch antennas may include other numbers of patches (e.g., one, two, four, etc.).

Within the examples below, the longest axis of the parasitic strips of a patch antenna is defined as the length (or x-axis) of the patch antenna, the shorter axis of the parasitic strips is defined as the height (or y-axis), and the axis from one layer to another is the depth (or z-axis).

FIG. 1 illustrates an example of a mobile device 100 (e.g., a cellphone) with a UWB antenna module 102 of some aspects. The mobile device also includes battery 104. The UWB antenna module 102 (module 102) includes three patch antennas of the present disclosure. The patch antennas of module 102 may each be 4 mm high and 11 mm wide (at the widest). Although the patch antennas in the illustrated example each have a height of 4 mm and a width of 11 mm, other measurements are possible for other aspects for the specific measurements given. In particular, changes in materials or bands for which the antennas are designed may result in different measurements. The height of the patch antennas is significantly less than the height of many conventional patch antennas.

The described patch antennas of module 102 resonate horizontally polarized for both 6.5 GHz and the 8 GHz modes, as further described with respect to FIGS. 2A-2C, below. Since both bands resonate horizontally, the patch antennas of module 102 are narrow (e.g., 4 mm). The narrow patch antennas of module 102 enable the module 102 to be narrower as well. The narrower module 102 leaves additional space in the mobile device 100 for a taller battery 104, for example. As an additional advantage, the narrower patch antennas of module 102 also allow a shorter combined height (from the top of the upper antenna to the bottom of the lower antenna) of the vertically aligned patch antennas.

The illustrated aspects in several figures herein are dual band antennas with the frequencies of the two bands that the antenna is most sensitive to being around 6.5 GHz and 8 GHz. However, in other aspects of the disclosed low-footprint dual-band UWB antenna modules, other bands may be used. For example, in some aspects, the two bands that the antenna is most sensitive to may be around 2.4 GHz and 5.1 GHz. Still other aspects may be sensitive to any two different frequency, bands with the length of the parasitic strips being configured to resonate at those frequencies rather than (as illustrated herein) 6.5 GHz and 8.0 GHz.

Figure 2A:
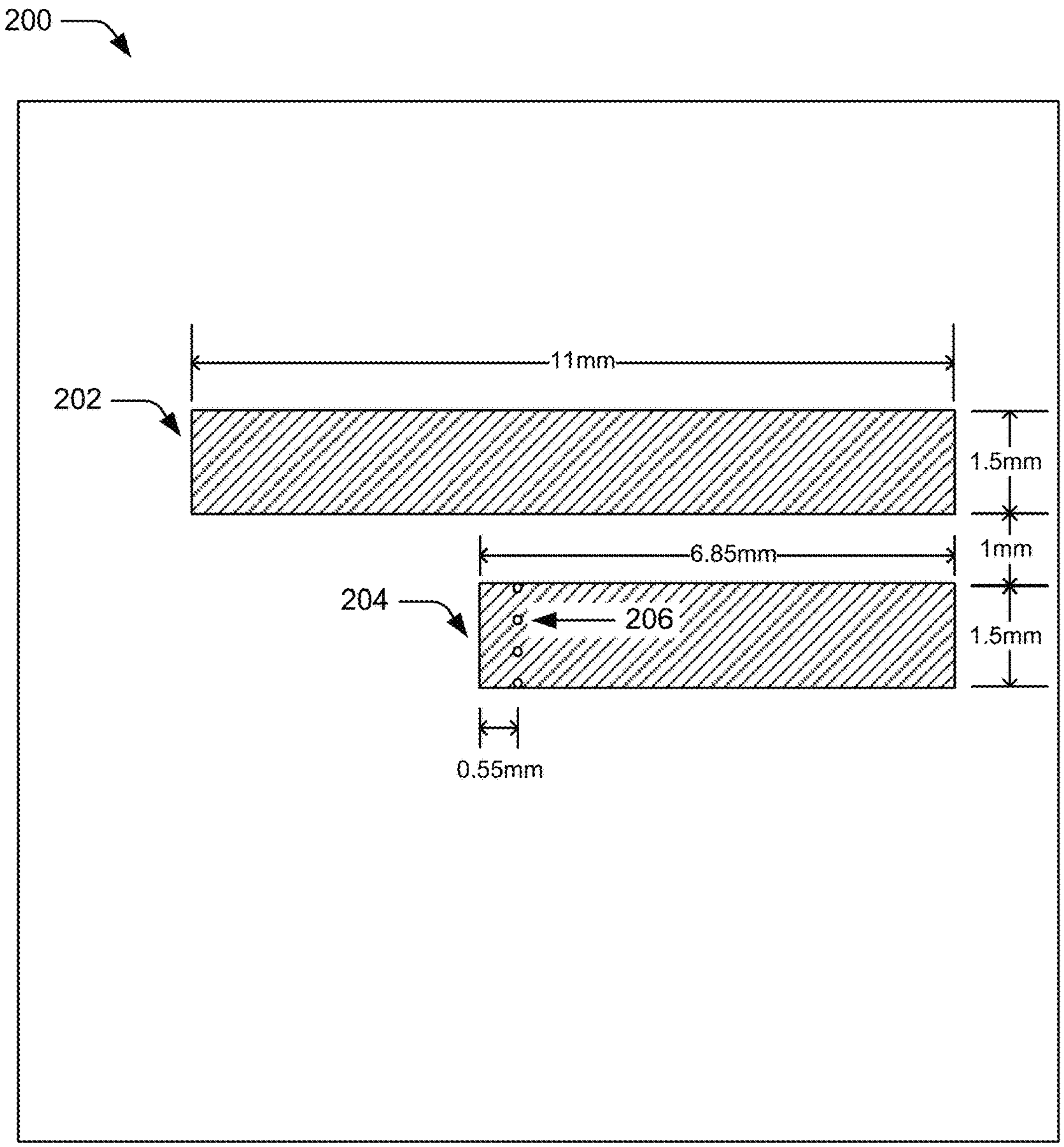
FIG. 2A illustrates an example of the top layer (layer 2) of a patch antenna with two parasitic strips.
Figure 2B:
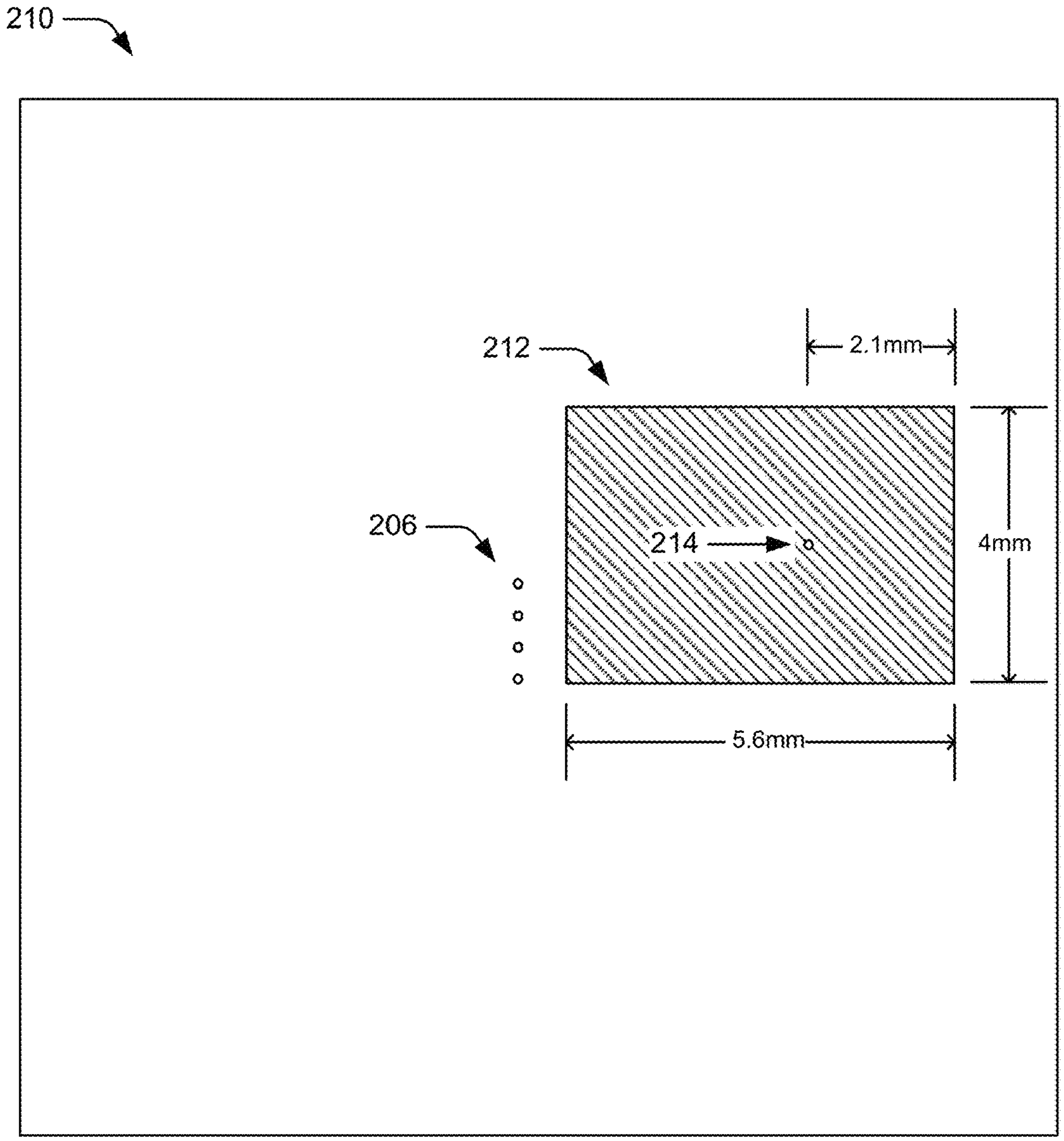
FIG. 2B illustrates an example of the middle layer (layer 1) of a patch antenna with a feeding plate.
Figure 2C:
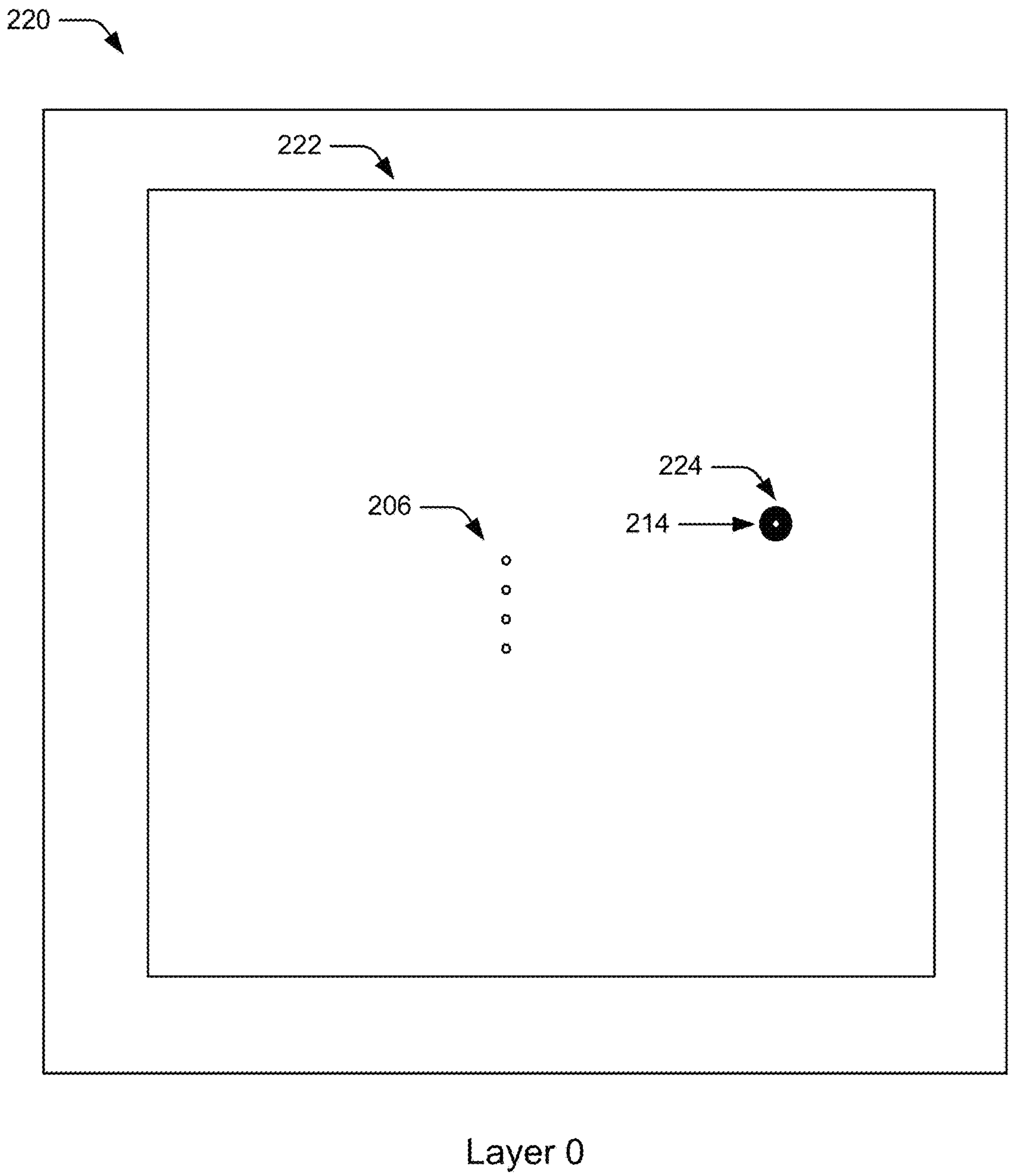
FIG. 2C illustrates an example of the bottom layer (layer 0) of a patch antenna with a conductive ground plate.
Figure 2D:
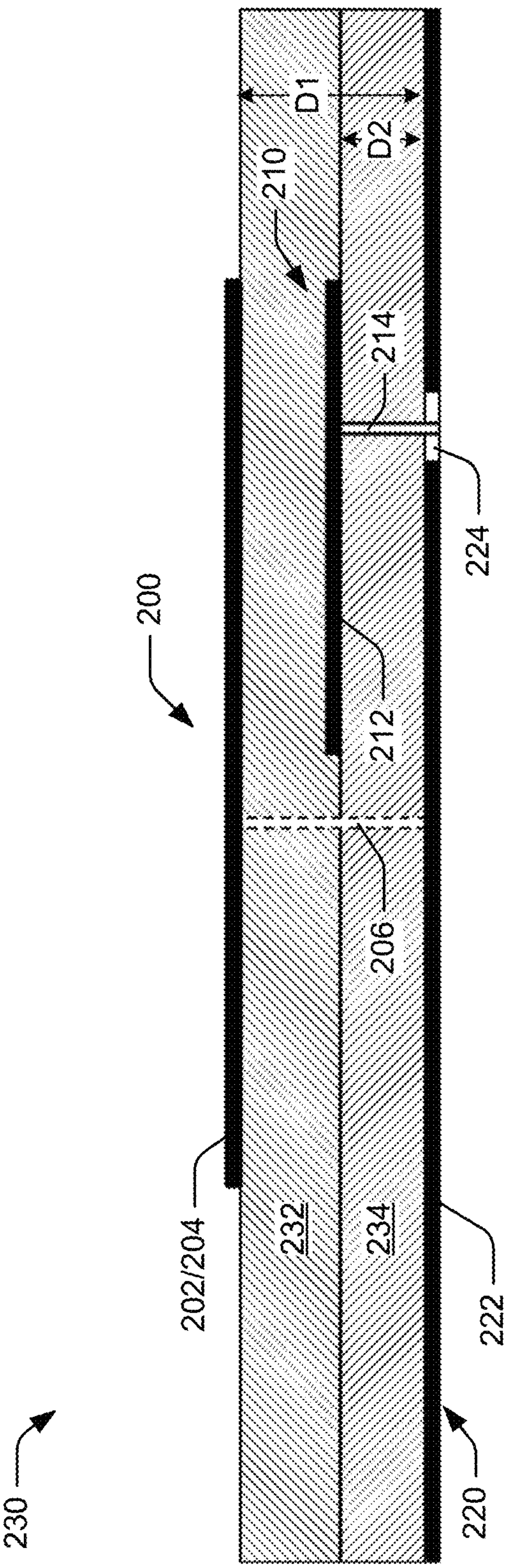
FIG. 2D is a cross-sectional illustration of a patch antenna including the layers of FIGS. 2A-2C.

FIGS. 2A-2C illustrate three layers of an example single patch antenna. FIG. 2D is a cross-sectional illustration of a patch antenna 230 including the layers of FIGS. 2A-2C, separated by a first substrate 232 and a second substrate 234. Each layer of the patch antenna includes electrically conductive components (as numbered and described) set in or on non-conductive material that separates the conductive components. In the patch antenna, some components on each layer interact with components on one or both other layers. FIG. 2A illustrates an example of the top layer 200 (layer 2) of the patch antenna with two parasitic strips 202, 204. FIG. 2B illustrates an example of the middle layer 210 (layer 1) of the patch antenna with a feeding plate 212. FIG. 2C illustrates an example of the bottom layer 220 (layer 0) of the patch antenna with a conductive ground plate 222.

In FIG. 2A, parasitic strip 202 is an 11 mm long, 1.5 mm wide, open-circuited strip of conductive material (in this example, copper). In some aspects the conductive material is set in a layer of non-conductive material or non-conductive materials (e.g., ceramic, air, plastic, Liquid Crystal Polymer (LCP) substrate, etc.). The electrical length of parasitic strip 202 is one-half of a wavelength of an 8 GHz radio wave in the conductive material that the parasitic strip 202 is made of. As an open-circuited parasitic strip, the parasitic strip 202 is not directly connected by conductive material to any other component of the patch antenna. Because the electrical length of parasitic strip 202 is one-half of a wavelength of an 8 GHz radio wave and the parasitic strip 202 is an open-circuited parasitic strip, the parasitic strip 202 resonates at 8 GHz.

Parasitic strip 204 is a 6.85 mm long, 1.5 mm wide strip of conductive material (in this example, also copper). Parasitic strip 204 is shorted (i.e., short-circuited) (at 0.55 mm from a first edge (e.g., the left edge in the figure)) by grounding vias 206 to conductive ground plate 222 (in FIG. 2C). The electrical length of parasitic strip 204, from a second edge (e.g., the right edge in the figure) to the vias, is one-quarter of a wavelength of a 6.5 GHz radio wave in the conductive material. Because the electrical length of parasitic strip 204 is one-quarter of a wavelength of a 6.5 GHz radio wave and the parasitic strip 204 is short-circuited to ground, the parasitic strip 204 resonates at 6.5 GHz. The parasitic strips 202 and 204 are separated by a gap (e.g., a gap containing non-conductive material). In the illustrated aspect, the gap between the parasitic strips 202 and 204 is 1 mm. With the widths of each parasitic strip being 1.5 mm and a gap of 1 mm, the total width of the parasitic strip arrangement is 4 mm. As mentioned above, other widths are possible in other aspects of the patch antenna.

In FIG. 2B, the feeding plate 212 is connected, through a feeding pin 214 that passes through a hole 224 defined in conductive ground plate 222 (shown in FIG. 2C), to the electronics of the mobile device that the patch antenna is part of. In the illustrated aspect, the feeding plate 212 is 4 mm tall, and lies directly under a first side (e.g., the right side of the figure) of the parasitic strips 202 and 204. The feeding pin 214, in this aspect, is located directly beneath the vertical center of the gap between the parasitic strips 202 and 204. The position and width (e.g., 5.6 mm) of the feeding plate 212 allows the grounding vias 206 (from parasitic strip 204 of FIG. 2A) to pass through layer 210, a distance (e.g., 6.3 mm) from an edge (e.g., the right edge in the figure) of feeding plate 212, without contacting the feeding plate 212.

The feeding plate 212 is electromagnetically coupled to the parasitic strips 202 and 204. The electromagnetic coupling between the parasitic strip 202 and the feeding plate 212 creates a resonance of the patch antenna at 8 GHz. Similarly, the electromagnetic coupling between the parasitic strip 204 and the feeding plate 212 creates a resonance of the patch antenna at 6.5 GHz. The conductive ground plate 222 in FIG. 2C is square, however, in other aspects, the conductive ground plates can be other shapes. For example, the conductive ground plate can conform to the shape of the UWB antenna module. In some aspects, the multi-layer patch antenna has a depth of 0.45 mm (e.g., depth D1 illustrated in FIG. 2D). In some aspects, the substrate 234 between the conductive ground plate 222 and the feeding plate 212 has a depth of 0.23 mm (e.g., depth D2 illustrated in FIG. 2D).

One application of some conventional multiple patch antenna systems is determining the angle of arrival (AoA), relative to the orientation of a mobile device, of a signal (e.g., a signal within a frequency band of the multiple patch antenna). Such determinations of the AoA are based on the distance between the antennas and the time between receipts of the same signal at different antennas. The patch antenna modules of some aspects allow an AoA estimation with comparable or better accuracy than conventional patch antennas, while occupying a smaller footprint than the conventional patch antennas.

Figure 3:
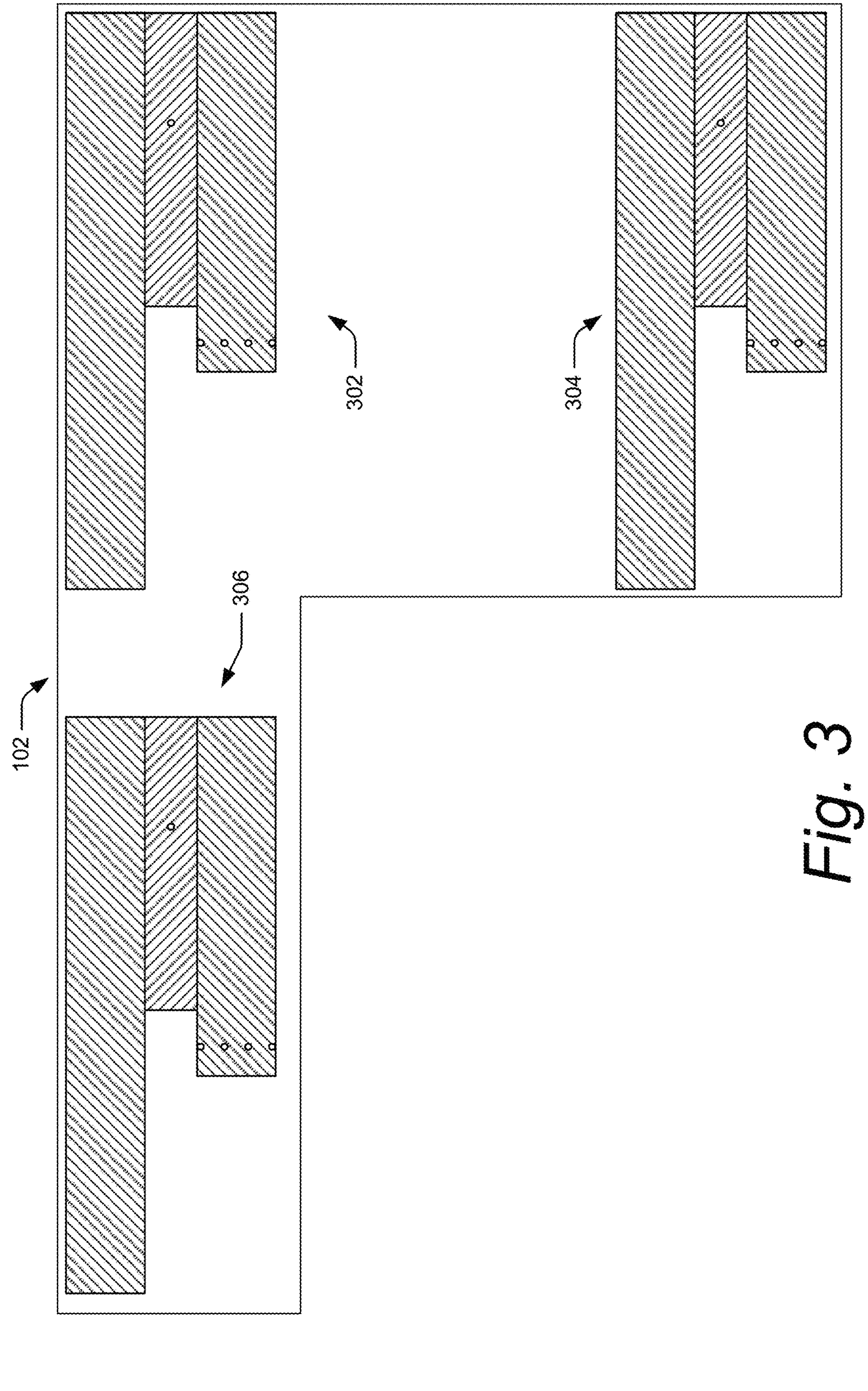
FIG. 3 illustrates a UWB antenna module with three patch antennas of some aspects.

FIG. 3 illustrates a UWB antenna module with three patch antennas of some aspects. Patch antenna 302 and patch antenna 304 are positioned (oriented) along a first axis (in the illustrated aspect, the first axis is a vertical axis, however, in other aspects, the first axis may be a non-vertical axis). Patch antenna 306 is positioned (oriented) along a second axis (in the illustrated aspect, the second axis is a horizontal axis, however, in other aspects, the second axis may be a non-horizontal axis) with patch antenna 302. Patch antenna 302 may be referred to as a common patch antenna. Patch antenna 304 may be referred to as a vertical patch antenna. Patch antenna 306 may be referred to as a horizontal patch antenna. The three patch antennas 302, 304, and 306 allow improved angle of arrival (AoA) estimations compared to a single pair of patch antennas. In the illustrated aspect the first axis and second axis are at right angles to each other (i.e., the axes meet at an angle of 90 degrees). However, in other aspects, the first axis and the second axis may meet at an angle between 80 degrees and 100 degrees, or at some other angle. Parasitic strips in patch antennas may be aligned parallel to the vertical or aligned parallel to the horizontal axis (either of which may be arbitrarily designated as either the first axis or the second axis). For example, patch antennas 302-306 in FIG. 3 are aligned parallel to the horizontal axis. In other aspects patch antennas may be aligned parallel to the vertical axis (see, e.g., FIG. 4A) or aligned at an angle that is not parallel to either the first or second axis (see, e.g., FIG. 4B).

Figure 4A:
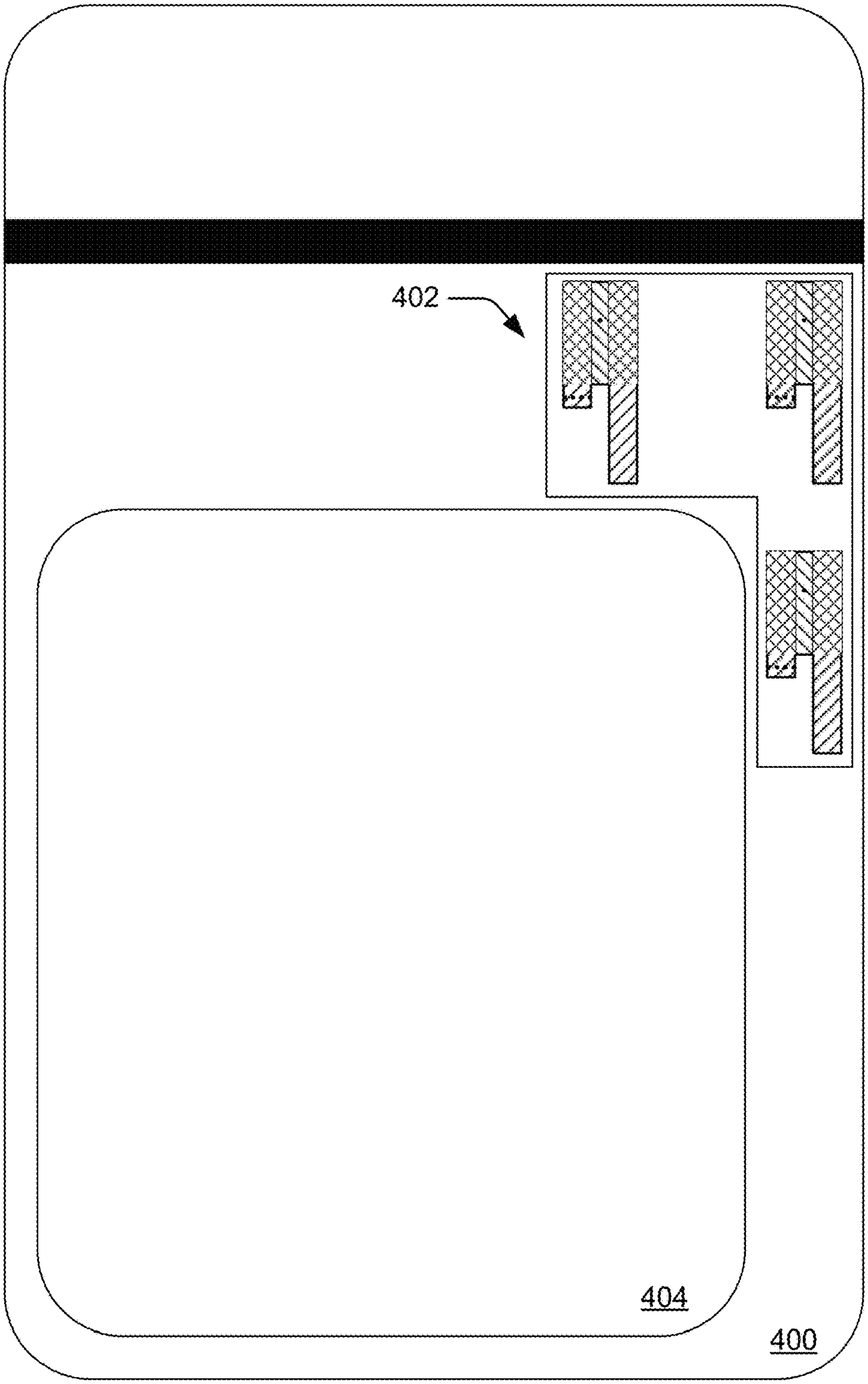
FIG. 4A illustrates an example of a mobile device with a UWB antenna module with vertically oriented patch antennas and a wider and shorter battery of some aspects.
Figure 4B:
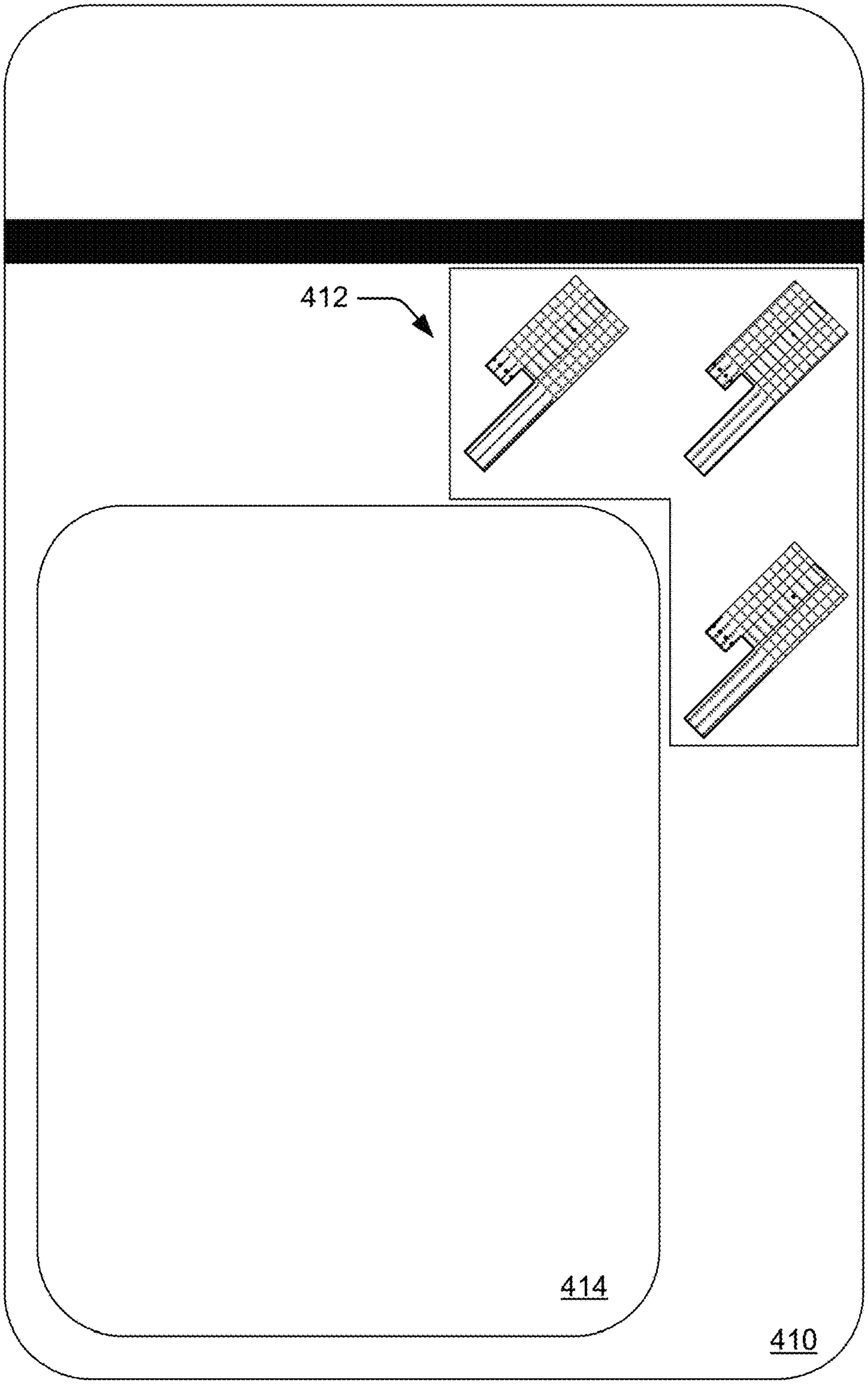
FIG. 4B illustrates an example of a mobile device with a UWB antenna module with diagonally oriented patch antennas and a slightly wider and slightly shorter battery of some aspects.

Previously described FIG. 1 showed one example of a UWB antenna module of the present disclosure. FIG. 4A illustrates another example of a mobile device 400 with a UWB antenna module 402 with vertically oriented patch antennas and battery 404. Battery 404 is both wider and shorter than battery 104 of FIG. 1. FIG. 4B illustrates a further example of a mobile device 410 with the UWB antenna module 412 with diagonally oriented patch antennas. The patch antennas oriented diagonally relative to a side of the mobile device. Battery 414 is slightly wider and slightly shorter than battery 104, but slightly narrower and slightly taller than battery 404. In FIG. 4B, the parasitic strips are aligned at approximately 45 degrees from both the horizontal axis and vertical axis that the patch antennas as a whole are aligned with. However, in other aspects, the parasitic strips may be aligned at different angles to the axes that the patch antennas as a whole are aligned with.

As described above, the lengths of the parasitic strips may be determined by the material of the parasitic strips and bands that the antenna is designed to receive. The widths of the parasitic strips and the width of the gap between the parasitic strips are less-tightly constrained. In some cases, the width of each parasitic strip is between one-twelfth and one-quarter of the length of the open-circuited parasitic strip and the gap between the parasitic strips is between one-twentieth and one-fifth the length of the open-circuit parasitic strip. In other cases, each of the first and second parasitic strips are at least one-twelfth as wide as the electrical length of the first parasitic strip and at most one-quarter as wide as the electrical length of the first parasitic strip. In some cases, the first and second parasitic strips are separated by a gap containing non-conductive material, the gap being at least one-twentieth as wide as the electrical length of the first parasitic strip and at most one-fifth as wide as the electrical length of the first parasitic strip. In additional cases, each of the first and second parasitic strips is at least one-sixth as wide as the electrical length of the second parasitic strip and each of the first and second parasitic strips is at most one-half as wide as the electrical length of the second parasitic strip. Alternatively, the width of each parasitic strip can be between one-sixth and one-half of the length of the short-circuited parasitic strip and the gap between the parasitic strips being between one-tenth and two-fifths the length of the short-circuited parasitic strip. In the illustrated aspects, the widths of the parasitic strips are the same, but this is not required.

Conclusion

Although implementations of lower-footprint dual-band UWB antenna modules have been described in language specific to certain features and/or methods, the subject of the appended claims is not necessarily limited to the specific features or methods described. Rather, the specific features and methods are disclosed as example implementations of UWB antenna modules, and other equivalent features and methods are intended to be within the scope of the appended claims. Further, various different aspects are described, and it is to be appreciated that each described aspect can be implemented independently or in connection with one or more other described aspects. For example, these techniques may be realized using different materials or bandwidths, which may be further divided, combined, and so on. Thus, these figures illustrate some of the many configurations capable of embodying the current disclosure.

The invention claimed is:

1. A multi-layer dual-band antenna comprising:

a set of patch antennas comprising at least three patch antennas arranged in an "L" shape having a first and second substantially perpendicular axes, a first patch antenna of the at least three patch antennas positioned along the first axis and a second patch antenna of the at least three patch antennas positioned along the first axis and the second axis, and a third patch antenna of the at least three patch antennas positioned along the second axis, each patch antenna comprising:

a first layer comprising a conductive ground plate;

a second layer comprising a feeding plate; and a third layer comprising two parasitic strips, a first of the two parasitic strips being an open-circuited parasitic strip configured to resonate at a first frequency and a second of the two parasitic strips being shorted to the conductive ground plate and configured to resonate at a second frequency, the first and second parasitic strips aligned at approximately 45 degrees from the first and second substantially perpendicular axes, the first frequency within a first frequency band of the dual-band antenna and the second frequency being within a second frequency band of the dual-band antenna.

2. The multi-layer dual-band antenna of claim 1, wherein the first frequency band of the dual-band antenna is a different frequency than the second frequency band of the dual-band antenna-and the second parasitic strip has an electrical length within 10% of one-quarter of a wavelength of the second frequency band.

3. The multi-layer dual-band antenna of claim 2 wherein each of the first and second parasitic strips is at least one-twelfth as wide as the electrical length of the first parasitic strip and at most one-quarter as wide as the electrical length of the first parasitic strip.

4. The multi-layer dual-band antenna of claim 3, wherein the first and second parasitic strips are separated by a gap containing non-conductive material, the gap being at least one-twentieth as wide as the electrical length of the first parasitic strip and at most one-fifth as wide as the electrical length of the first parasitic strip.

5. The multi-layer dual-band antenna of claim 2, wherein each of the first and second parasitic strips is at least one-sixth as wide as the electrical length of the second parasitic strip and each of the first and second parasitic strips is at most one-half as wide as the electrical length of the second parasitic strip.

6. The multi-layer dual-band antenna of claim 5, wherein each of the first and second parasitic strips are separated by a gap containing non-conductive material, the gap being at least one-tenth as wide as the electrical length of the second parasitic strip and at most two-fifths as wide as the electrical length of the second parasitic strip.

7. The multi-layer dual-band antenna of claim 1, wherein the first axis and the second axis meet at an angle between 80 degrees and 100 degrees.

8. The multi-layer dual-band antenna of claim 1, wherein the first and second parasitic strips of each patch antenna are parallel to the first axis.

9. The multi-layer dual-band antenna of claim 1, wherein the first frequency is about 8 GHz and the second frequency is about 6.5 GHZ.

10. The multi-layer dual-band antenna of claim 1, wherein the first frequency is about 5.1 GHz and the second frequency is about 2.4 GHz.

11. The multi-layer dual-band antenna of claim 1, wherein the first and second parasitic strips of each patch antenna are aligned at exactly 45 degrees from the first and second substantially perpendicular axes.

* * * * *